United States Patent
Choi et al.

(10) Patent No.: US 12,122,423 B2
(45) Date of Patent: Oct. 22, 2024

(54) AUTONOMOUS VEHICLE AND DRONE-BASED EMERGENCY RESPONSE METHOD THEREOF

(71) Applicants: Hyundai Motor Company, Seoul (KR); Kia Motors Corporation, Seoul (KR)

(72) Inventors: Eun Young Choi, Seoul (KR); Jin Su Jeong, Gyeonggi-do (KR); Ki Seok Seong, Chungcheongnam-do (KR); Min Sang Yu, Gyeonggi-do (KR); Hyeong Jin Ham, Gyeonggi-do (KR); Rosali Sun Pyun, Gyeonggi-do (KR); Dong Il Yang, Seoul (KR); Woo Jin Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 388 days.

(21) Appl. No.: 17/086,582

(22) Filed: Nov. 2, 2020

(65) Prior Publication Data

US 2022/0024483 A1    Jan. 27, 2022

(30) Foreign Application Priority Data

Jul. 27, 2020    (KR) .................. 10-2020-0093293

(51) Int. Cl.
*B60W 60/00*    (2020.01)
*B60W 30/095*    (2012.01)
(Continued)

(52) U.S. Cl.
CPC .... *B60W 60/0015* (2020.02); *B60W 30/0956* (2013.01); *B60W 30/18163* (2013.01);
(Continued)

(58) Field of Classification Search
CPC ......... B60W 60/0015; B60W 30/0956; B60W 30/18163; B60W 40/04; B60W 2556/65;
(Continued)

(56) References Cited

U.S. PATENT DOCUMENTS 10,137,984 B1 * 11/2018 Flick .................... G08G 5/0039
11,579,633 B1 *  2/2023 Haslam ..................... G05D 1/12
(Continued)

FOREIGN PATENT DOCUMENTS

DE    102018221997 A1 *  6/2020
EP       3614356 A1 *  2/2020
(Continued)

*Primary Examiner* — Muhammad Shafi
(74) *Attorney, Agent, or Firm* — Fox Rothschild LLP

(57) ABSTRACT

An autonomous vehicle and a drone-based emergency response method thereof are provided. The autonomous vehicle includes a communication device that supports communication with a drone and a detection device that detects vehicle status information and driving environment information. A processing device detects an emergency situation occurring on a road based on the vehicle status information and the driving environment information while autonomous driving and performs a response logic matching the recognized emergency situation using the drone.

15 Claims, 13 Drawing Sheets

(51) Int. Cl.
| | |
|---|---|
| *B60W 30/18* | (2012.01) |
| *B60W 40/04* | (2006.01) |
| *B64C 39/02* | (2023.01) |
| *B64D 47/02* | (2006.01) |
| *B64U 10/13* | (2023.01) |
| *B64U 101/00* | (2023.01) |
| *G05D 1/00* | (2024.01) |
| *G08G 1/00* | (2006.01) |
| *B64U 101/30* | (2023.01) |

(52) U.S. Cl.
CPC ............. *B60W 40/04* (2013.01); *B64D 47/02* (2013.01); *G05D 1/101* (2013.01); *G08G 1/22* (2013.01); *B60W 2556/65* (2020.02); *B64U 10/13* (2023.01); *B64U 2101/30* (2023.01); *B64U 2201/00* (2023.01)

(58) Field of Classification Search
CPC .. B60W 30/08; B60W 2420/52; B60W 40/02; B60W 60/007; B60W 2556/45; B60W 2420/408; B64C 39/024; B64C 2201/027; B64C 2201/12; B64C 2201/14; B64C 39/02; B64C 2201/146; B64D 47/02; G05D 1/101; G05D 1/102; G08G 1/22; G08G 1/096791; G08G 1/162; B60Q 1/52; B60Q 2300/43; B60Y 2300/08; B64U 10/13; B64U 2101/30; B64U 2201/00; B64U 2201/20

USPC .......................................................... 701/3
See application file for complete search history.

(56) References Cited

U.S. PATENT DOCUMENTS

| | | | |
|---|---|---|---|
| 2016/0272317 A1* | 9/2016 | Cho | ..................... G05D 1/0094 |
| 2018/0233038 A1* | 8/2018 | Kozloski | .............. G08G 1/0175 |
| 2020/0380870 A1* | 12/2020 | Eguchi | ................. G05D 1/0094 |
| 2021/0174616 A1 | 6/2021 | Yu et al. | |
| 2021/0398434 A1* | 12/2021 | Madden | ............... G08G 1/0955 |

FOREIGN PATENT DOCUMENTS

| | | | |
|---|---|---|---|
| KR | 102136293 B1 * | 8/2018 | |
| KR | 20210070477 A | 6/2021 | |

* cited by examiner

AUTONOMOUS VEHICLE AND DRONE-BASED EMERGENCY RESPONSE METHOD THEREOF

CROSS-REFERENCE TO RELATED APPLICATION

This application claims the benefit of priority to Korean Patent Application No. 10-2020-0093293, filed on Jul. 27, 2020, the entire contents of which are incorporated herein by reference.

TECHNICAL FIELD

The present disclosure relates to an autonomous vehicle and a drone-based emergency response method thereof.

BACKGROUND

A secondary accident may occur in the process of taking safety measures for a primary accident on a road causing casualties and therefore, efforts has been continuously made to improve a system for preventing secondary accidents and supplement related regulations. For example, a manual that guides action instructions for preventing secondary accidents during an accident are produced and distributed, and measures such as providing driver education on prevention of secondary accidents have been proposed. In addition, as advanced safety devices such as advanced driver assist systems (ADAS) have become common in vehicles in recent years, compulsory installation of a device capable of preventing secondary accidents on the vehicle itself has been considered.

SUMMARY

The present disclosure provides an autonomous vehicle that responds to an emergency situation using a drone when an emergency situation occurs on a road during autonomous driving, and an emergency response method of the autonomous vehicle using the drone.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an autonomous vehicle may include a communication device that supports communication with a drone, a detection device configured to detect vehicle status information and driving environment information, and a processing device configured to detect an emergency situation occurring on a road based on the vehicle status information and the driving environment information while autonomous driving and perform a response logic matching the recognized emergency situation using the drone.

The emergency situation may be one of a vehicle emergency situation, an another-vehicle emergency situation, a front road emergency situation, and a platoon driving situation. The processing device may be configured to determine activation of flight of the drone based on a distance between the autonomous vehicle and a following vehicle in a same lane as the autonomous vehicle and a relative speed of the following vehicle, and allow the drone to move to front of the following vehicle and output a warning.

In addition, the processing device may be configured to provide the warning to following vehicles in an order of a smallest distance between the autonomous vehicle and two or more following vehicles when the following vehicles are located in the same lane. The processing device may be configured to transmit a fake radar signal indicating that a vehicle in which an emergency situation has occurred is present on a front road toward rear of the autonomous vehicle. The processing device may be configured to obtain surrounding environment information of another vehicle using sensors mounted on the drone and transmit the obtained information to an emergency agency in the another-vehicle emergency situation.

The processing device may further be configured to output the warning to neighboring vehicles of the another vehicle using the drone. The processing device may be configured to obtain situation information of a front road using sensors mounted on the drone, transmit the situation information to an emergency agency, and induce evacuation of a following vehicle in the front road emergency situation. The processing device may be configured to provide information indicating that the autonomous vehicle is platoon-driving in front of a following vehicle to the following vehicle using a flight pattern of the drone in the platoon driving situation. The processing device may also be configured to identify and determine whether the following vehicle is able to overtake using the drone when recognizing that the following vehicle is ready to overtake.

According to an aspect of the present disclosure, a drone-based emergency response method in an autonomous vehicle may include detecting vehicle status information and driving environment information while autonomous driving, recognizing an emergency situation occurring on a road based on the vehicle status information and the driving environment information, and performing a response logic matching the recognized emergency situation using the drone.

The performing of the response logic may include determining activation of flight of the drone based on a distance between the autonomous vehicle and a following vehicle traveling in a same lane as the autonomous vehicle and a relative speed of the following vehicle and transmit a signal to the drone indicating an instruction to fly, and allowing, by the drone, to move to front of the following vehicle and output a warning. The performing of the response logic may include transmitting a fake radar signal indicating that a vehicle in which an emergency situation has occurred exists on a front road toward rear of the autonomous vehicle.

Additionally, the performing of the response logic may include instructing the drone to move to a second vehicle in which an emergency situation has occurred in the another-vehicle emergency situation, obtaining, by the drone, surrounding environment information of the second vehicle and transmitting the obtained information to an emergency agency, and providing, by the drone, a warning to a neighboring vehicle of the second vehicle. The performing of the response logic may include instructing the drone to fly in the front road emergency situation, obtaining, by the drone, front road situation information and transmitting the obtained information to an emergency agency, and inducing, by the drone, evacuation of following vehicles.

The performing of the response logic may include instructing the drone to fly in the platoon driving situation, and outputting, by the drone, information indicating that the autonomous vehicle is platoon-driving to a following vehicle following a platooning queue. In addition, the performing of the response logic may further include requesting the drone to identify whether overtaking is possible in response to determining that the following vehicle is ready to overtake, and identifying, by the drone, whether the overtaking is possible and performing guide according to the request.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
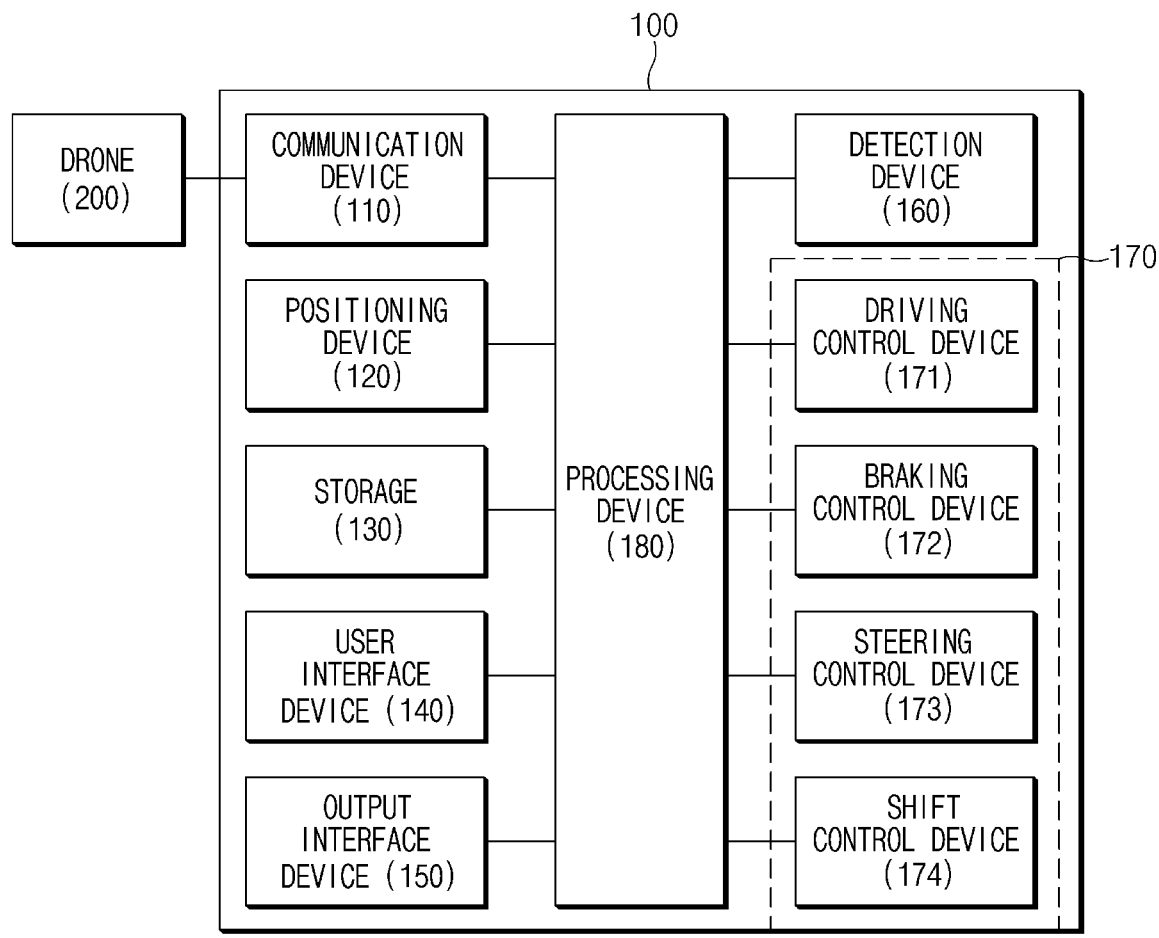
FIG. 1 is a block configuration diagram showing an autonomous vehicle according to exemplary embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
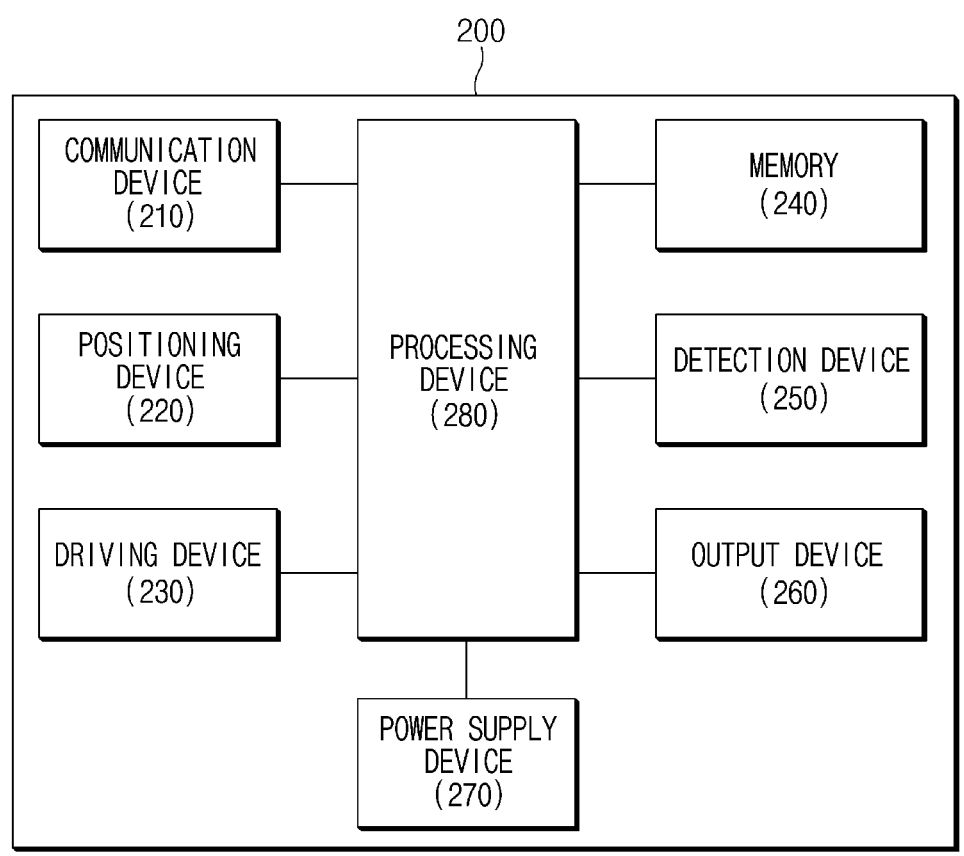
FIG. 2 is a block configuration diagram showing a drone according to exemplary embodiments of the present disclosure.

The disclosure provides technology for allowing an autonomous vehicle to prepare for an emergency situation (e.g., urgent and/or dangerous situation) that may occur on a road in connection with a drone in a situation in which the autonomous vehicle collects and processes a substantial amount of information while driving. FIG. 1 is a block configuration diagram showing an autonomous vehicle according to exemplary embodiments of the present disclosure, and FIG. 2 is a block configuration diagram showing a drone according to exemplary embodiments of the present disclosure.

Referring to FIG. 1, an autonomous vehicle 100 may include a communication device 110, a positioning device 120, storage 130, a user interface device 140, and an output interface device 150, a detection device 160, a vehicle control device 170, and a processing device 180, which are connected via an in-vehicle network. The in-vehicle network may be implemented with, for example, a Controller Area Network (CAN), a Media Oriented Systems Transport (MOST) network, a Local Interconnect Network (LIN), Ethernet, and/or an X-by-Wire (Flexray).

The communication device 110 may support wireless communication between the autonomous vehicle 100 and an external device (e.g., a drone 200). The communication device 110 may support wireless communication using at least one of wireless Internet technologies such as Wireless LAN (WLAN) (Wi-Fi), Wireless broadband (Wibro) and/or World Interoperability for Microwave Access (Wimax), short-range communication technologies such as Bluetooth, Near Field Communication (NFC), infrared communication (IrDA, infrared Data Association) and/or Ultra Wideband (UWB), and mobile communication technologies such as Long Term Evolution (LTE), LTE-Advanced and/or International Mobile Telecommunication (IMT)-2020.

The positioning device 120 may be configured to measure a current position of the autonomous vehicle 100. The positioning device 120 may also be configured to measure a position of the vehicle using at least one of positioning techniques such as Global Positioning System (GPS), Dead Reckoning (DR), Differential GPS (DGPS), and Carrier Phase Differential GPS (CDGPS). For example, the positioning device 120 may be configured to calculate the current position of the vehicle using signals transmitted from three or more GPS satellites. The positioning device 120 may be configured to calculate a distance between the positioning device 120 and the satellite using a time difference between a time when the satellite transmits a signal and a time when the positioning device 120 receives the signal. The positioning device 120 may further be configured to calculate the current position of the autonomous vehicle 100 by using the calculated distance between the positioning device 120 and the satellite and position information of the satellite included in the transmitted signal. In particular, the positioning device 120 may be configured to calculate the current position using a triangulation method.

The storage 130 may be configured to store instructions (a program) to be executed by the processing device 180 and may be configured to temporarily store input data and/or output data of the processing device 180. The storage 130 may be configured to store software programmed to perform autonomous driving and/or map information. Additionally, the storage 130 may be configured to store logic for each emergency situation. The storage 130 may be implemented with at least one storage medium (recording medium) of storage media such as a flash memory, a hard disk, an SD card (Secure Digital Card), a random access memory (RAM), a static random access memory (SRAM), a ROM, a Programmable Read Only Memory (PROM), an Electrically Erasable and Programmable ROM (EEPROM), an Erasable and Programmable ROM (EPROM), a register, a removable disk and a web storage.

The user interface device 140 may be configured to generate data according to a user's operation. For example, the user interface device 140 may be configured to generate data for turning on or off an autonomous driving function according to a user input. The user interface device 140 may include at least one of input devices such as a keyboard, a keypad, a button, a switch, a touch pad, a touch screen, and a microphone.

The output interface device 150 may be configured to output progress status and/or results according to the operation of the processing device 180 in the form of information recognizable by the user using at least one of the five senses (e.g., sight, hearing touch, taste, and smell). The output interface device 150 may include a display, an audio output module, and/or a tactile signal output module. The display may be implemented with at least one of display devices such as a liquid crystal display (LCD), a thin film transistor liquid crystal display (TFT LCD), an organic light-emitting diode (OLED) display, a flexible display, a 3D display, a transparent display, ahead-up display (HUD), a touch screen, and a cluster. The audio output module may include, for example, a receiver, a speaker, and/or a buzzer. The tactile signal output module may be configured to adjust and output an intensity and/or pattern of vibration using a vibrator or the like.

The detection device 160 may be configured to detect (e.g., obtain) status information and driving environment information of the vehicle using various sensors mounted on the autonomous vehicle 100 while the vehicle is traveling. The sensors may include a sound sensor, a wheel speed sensor, an acceleration sensor, an image sensor (camera), an Inertial Measurement Unit (IMU), a RADAR (Radio Detecting And Ranging), a LiDAR (Light Detection And Ranging), an ultrasonic sensor, and/or a steering angle sensor.

The vehicle control device 170 may be configured to control the behavior (e.g., acceleration, braking and/or steering) of the autonomous vehicle 100 according to an instruction from the processing device 180, and may include a driving control device 171, a braking control device 172, a steering control device 173, a shift control device 174, and the like. The driving control device 171, the braking control device 172, the steering control device 173, and the shift control device 174 may be implemented with one electric control unit (ECU) or may be implemented with electronic control devices, respectively. The electric control unit may include a memory that stores software programmed to perform a predetermined function (operation), a processor that executes software stored in the memory, and the like.

The driving control device 171 may be configured to operate a power source (e.g., an engine and/or a driving motor) of the autonomous vehicle 100. The driving control device 171 may be configured to adjust an output (e.g., output torque) of the power source according to accelerator pedal position information or a driving speed requested from the processing device 180. The driving control device 171 may include an engine management system (EMS) and/or a motor control unit (MCU). The braking control device 172 may be configured to adjust deceleration (e.g., braking) of the autonomous vehicle 100, and a braking force of the autonomous vehicle 100 based on the position of a brake pedal or the braking force required from the processing device 180. The braking control device 172 may include an electronic stability control (ESC), or the like.

The steering control device 173 may be configured to adjust steering of the autonomous vehicle 100 and may include a Motor Drive Power Steering (MDPS) or the like. The steering control device 173 may be configured to adjust a steering angle of the vehicle according to an instruction from the processing device 180. The shift control device 174 may be configured to operate a transmission of the autonomous vehicle 100 according to an instruction from the processing device 180. The shift control device 174 may be configured to adjust a transmission ratio according to a gear position and/or a gear state range. The shift control device 174 may be implemented with a transmission control unit (TCU) or the like.

The processing device 180 may be configured to execute overall operation of the autonomous vehicle 100 and be implemented with at least one of an application specific integrated circuit (ASIC), a digital signal processor (DSP), a programmable logic device (PLD), field programmable gate array (FPGAs), a central processing device (CPU), microcontrollers, and microprocessors. The processing device 180 may be configured to execute an autonomous driving function according to a user input. The processing device 180 may be configured to execute the autonomous driving function when a destination is set. When autonomous driving is started, the processing device 180 may be configured to operate the vehicle control device 170 to perform autonomous driving.

The processing device 180 may be configured to obtain status information and driving environment information of the autonomous vehicle 100 using the detection device 160 during autonomous driving. The status information may include a vehicle speed, sound information (e.g., engine sound, tire sound, and/or brake sound) and/or whether or not it is failed to transfer a control right to a driver. The driving environment information may include a speed of another vehicle (e.g., a neighboring vehicle and/or a preceding vehicle or a second vehicle), a distance between the vehicle (e.g., the subject vehicle) and the second vehicle, and/or a surrounding image. The processing device 180 may be configured to recognize a situation (e.g., road situation) on a road on which the autonomous vehicle 100 is traveling based on status information and driving environment information of the autonomous vehicle 100. The processing device 180 may be configured to determine whether the recognized road situation is an emergency situation by analyzing the status information and the driving environment information. The processing device 180 may be configured to determine an emergency response (e.g., activation of a drone) using the drone 200 when the recognized road situation belongs to the four emergency situations in the following Table 1.

TABLE 1

| Type | Example |
|---|---|
| 1) Vehicle emergency situation | Vehicle is in emergency stop (quick stop)- fail to transfer driving control to driver (non-response to request for transfer of driving control) |

TABLE 1-continued

| Type | Example |
|---|---|
| 2) Another-vehicle emergency situation | Failure of vehicle<br>Another vehicle that stops on road (e.g., neighboring vehicle and/or preceding vehicle)-another vehicle with abnormal driving pattern (e.g., drinking, recklessness, or robbers)<br>Failure of another vehicle |
| 3) Front road emergency situation | Occurrence of smoke and/or fire in road and/or tunnel-flashing of multiple vehicle emergency lights<br>Detection of movement of people on road |
| 4) Platoon driving situation | Situation in which following vehicle in platooning queue is attempting to takeover |

In particular, a vehicle emergency situation may indicate a situation in which an emergency situation occurs in the autonomous vehicle 100 itself (e.g., a situation in which a failure occurs in a host or subject vehicle), an another-vehicle emergency situation may indicate a situation in which an emergency situation occurs in another or second vehicle (e.g., a preceding vehicle) located in the vicinity of the autonomous vehicle 100 (e.g., a situation in which another vehicle stops in a lane in which the subject vehicle is traveling), a front road emergency situation may indicate a situation in which an emergency situation occurs on a front road of the autonomous vehicle 100 (e.g., a traffic accident or road construction on the front road, or the like), and a platoon driving situation may indicate a situation in which the autonomous vehicle 100 performs platoon driving.

The processing device 180 may be configured to perform a response logic (e.g., an emergency response logic) matching the determined emergency situation. In particular, the processing device 180 may be configured to perform the response logic in connection with the drone 200. The autonomous vehicle 100 may be configured to collect more types of information using the drone 200 capable of moving not only in the transverse direction but also in the longitudinal direction, and may expand an information collection area.

Referring to FIG. 2, the drone 200 may include a communication device 210, a positioning device 220, a driving device 230, a memory 240, a detection device 250, an output device 260, and a power supply device 270, and a processing device 280. The drone 200 may be operated based on the autonomous vehicle 100 or may be operated using one point within a specified management area (e.g., a highway) as a base point.

The communication device 210 may be configured to perform wireless communication with an external device (e.g., a vehicle and/or a server). The communication device 210 may support wireless communication using at least one of wireless Internet technologies such as Wireless LAN (WLAN) (Wi-Fi), Wireless broadband (Wibro) and/or World Interoperability for Microwave Access (Wimax), short-range communication technologies such as Bluetooth, Near Field Communication (NFC), infrared communication (IrDA, infrared Data Association) and/or Ultra Wideband (UWB), and mobile communication technologies such as Long Term Evolution (LTE), LTE-Advanced and/or International Mobile Telecommunication (IMT)-2020.

Additionally, the positioning device 220 may be configured to measure a current position of the drone 200, that is, the position of the drone. The positioning device 220 may be implemented with a GPS (Global Positioning System) receiver. The positioning device 220 may be configured to calculate the current position of the drone 200 using a triangulation method. The driving device 230 may be configured to adjust a motor output, that is, a rotation speed of the motor according to a control command (control signal) of the processing device 280. The driving device 230 may be implemented with an electronic speed controller. The motor may be driven under the operation of the driving device 230 and may be coupled to a propeller to rotate together. The driving device 230 may be configured to adjust the flight of the drone 200 using a difference in rotation speed of the propeller.

The detection device 250 may be configured to obtain surrounding information of the drone through various sensors mounted on the drone 200. The detection device 250 may be configured to obtain image information around the drone using a camera (not shown) mounted on the drone 200. In addition, the detection device 250 may be configured to obtain surrounding information of the drone 200 using a radar and/or a LiDAR. The memory 240 may be configured to store information obtained (detected) by the detection device 250. The memory 240 may be configured to store the flight path of the drone 200 received via the communication device 210. The memory 240 may be configured to store software programmed to cause the processing device 280 to execute a predetermined operation. The memory 240 may be configured to store instructions to be executed by the processing device 280. The memory 240 may be implemented with one or more of storage medium (recording medium) such as a flash memory, a hard disk, a secure digital (SD) card, a random access memory (RAM), a read only memory (ROM), and an EEPROM (Electrically Erasable and Programmable ROM), EPROM (Erasable and Programmable ROM), registers, and a removable disk.

The output device 260 may be configured to output, for example, information and/or a warning according to an instruction from the processing device 280. The output device 260 may include a speaker, a projector, and/or a siren, for example. The power supply device 270 may be configured to supply power required for operation of each of the components mounted on the drone 200. The power supply device 270 may be configured to receive power from a battery or fuel cell installed in the drone 200 and supply power to each component.

The processing device 280 may be configured to transmit (transfer), to the driving device 230, movement information obtained using various sensors mounted on the drone 200 (e.g., a gyro, an acceleration sensor, an atmospheric pressure sensor, an ultrasonic sensor, a magnetometer, and/or a sound wave detector) and position information obtained using the positioning device 220. The processing device 280 may be configured to transmit surrounding information (e.g., surrounding images) collected by the detection device 250 to the autonomous vehicle 100 via the communication device 210. The processing device 280 may be configured to provide information or a warning to at least one other vehicle located around the autonomous vehicle 100 according to an instruction transmitted from the autonomous vehicle 100. In addition, the processing device 280 may be configured to induce the evacuation of other vehicles and/or occupants of the other vehicles located in the vicinity of the autonomous vehicle 100 to a safe place.

Hereinafter, it will be described that the autonomous vehicle 100 performs an emergency response in connection with the drone 200 for each emergency situation.

Vehicle Emergency Situation

The processing device 180 of the autonomous vehicle 100 may be configured to determine whether an emergency situation has occurred in the autonomous vehicle 100 based on information (e.g., status information and driving environment information) obtained using the detection device 160. The processing device 180 may be configured to determine that an emergency situation has occurred in the vehicle when the autonomous vehicle 100 suddenly stops within a driving lane. Alternatively, the processing device 180 may be configured to determine the vehicle emergency situation when the vehicle is diagnosed as malfunctioning. As a technology for diagnosing a failure of a vehicle, the failure diagnosis technology disclosed in Application No. 10-2019-0160200 previously filed by the present applicant may be used. Alternatively, the processing device 180 may also be configured to determine that an emergency situation has occurred in the autonomous vehicle 100 when switching (transfer) of the vehicle control to a driver is attempted and fails.

When an emergency situation occurs in the autonomous vehicle 100, the processing device 180 may be configured to instruct the drone 200 to fly (e.g., output an instruction to the drone indicating a flying operation). For example, the processing device 180 may be configured to determine activation of flight of the drone 200 when the autonomous vehicle 100 stops in an emergency or when it is difficult to switch vehicle control to the driver. When the activation of flight of the drone 200 is determined, the processing device 180 may be configured to transmit a command instructing the flight to the drone 200. In particular, the processing device 180 may be configured to transmit the current position of the autonomous vehicle 100 and a response method to the drone 200. The drone 200 may be operated based on the current position of the autonomous vehicle 100.

The drone 200 may move to the front of a following vehicle located directly behind the autonomous vehicle 100 within a lane in which the autonomous vehicle 100 is driving according to a response method (first response method) transmitted from the processing device 180 of the autonomous vehicle 100. The processing device 280 of the drone 200 may be configured to recognize or detect a following vehicle traveling at the rear of the autonomous vehicle 100 based on the current position of the autonomous vehicle 100. The processing device 280 of the drone 200 may be configured to operate the driving device 230 to move to the front of the recognized following vehicle. The processing device 280 of the drone 200 may be configured to output a warning providing a notification that a vehicle in which an emergency situation has occurred in front of the following vehicle. In particular, the processing device 280 may be configured to output a warning sound through the output device 260 or output a warning by adjusting a flight pattern (e.g., a vertical flight pattern) using the driving device 230.

According to another exemplary embodiment, when the vehicle is in an emergency situation, the processing device 180 of the autonomous vehicle 100 may be configured to detect a distance between the following vehicle in the lane in which the autonomous vehicle 100 is driving and the autonomous vehicle 100 and/or the speed of the following vehicle. The processing device 180 may be configured to calculate a relative speed of the following vehicle with respect to the autonomous vehicle 100 based on the detected distance between the following vehicle and the autonomous vehicle 100 and/or the speed of the following vehicle. The processing device 180 may be configured to determine a possibility of a collision with the following vehicle using the calculated relative speed of the following vehicle.

Particularly, the processing device 180 may further consider the distance between the following vehicle and the autonomous vehicle 100 when determining the possibility of a collision between the autonomous vehicle 100 and the following vehicle. In response to determining a possibility of a collision with the following vehicle, the processing device 180 may be configured to determine a response using the drone 200. When the response using the drone 200 is determined, the processing device 180 may be configured to instruct the drone 200 how to fly and respond. The drone 200 may move to the front of the following vehicle according to the instruction from the processing device 180 and output information indicating that a vehicle in which an emergency situation has occurred stops in front of the following vehicle. In particular, the drone 200 may sequentially provide warnings to following vehicles in the same lane as the autonomous vehicle 100.

According to another exemplary embodiment, the processing device 180 of the autonomous vehicle 100 may be configured to transmit a fake radar signal using a radar signal generating device (not shown) to notify the following vehicles that a vehicle in which an emergency situation has occurred is present in front of the following vehicles. The following vehicles may be configured to receive the fake radar signal transmitted from the autonomous vehicle 100, thus making it possible to recognize that a vehicle has stopped due to occurrence of an emergency situation is present in front of the following vehicles even at a distance. As described above, when an emergency situation occurs in the autonomous vehicle 100, it may be possible to induce deceleration of following vehicles following the autonomous vehicle 100 by transmitting the fake radar signal. In addition, the processing device 180 may be configured to perform a response using the drone 200 and transmit a fake radar signal using a radar signal generating device (not shown) at the same time or after performing the response using the drone 200.

Another-Vehicle Emergency Situation

The processing device 180 of the autonomous vehicle 100 may be configured to determine whether an emergency situation has occurred in another or second vehicle (e.g., a preceding vehicle and/or a neighboring vehicle) based on the information obtained using the detection device 160. For example, when another vehicle has stopped in a driving lane in which the subject vehicle is traveling, the processing device 180 may be configured to determine that an emergency situation has occurred in the other vehicle. Alternatively, when the other vehicle is driving in an abnormal driving pattern (e.g., zigzag), the processing device 180 may be configured to determine that the driver of the other vehicle is in a dangerous state (e.g., drunk state or drowsy state) to drive the vehicle to recognize an emergency situation of other vehicles. Alternatively, the processing device 180 may be configured to determine whether the preceding vehicle has failed by analyzing the information obtained through the detection device 160, and in response to that the preceding vehicle has failed, recognize the another-vehicle emergency situation.

When the another-vehicle emergency situation is detected, the processing device 180 may be configured to instruct the drone 200 to activate flight. The drone 200 may perform a flight following another vehicle (e.g., the second vehicle) using the position information of the other vehicle provided from the autonomous vehicle 100. The drone 200 may be configured to collect surrounding environment information of the other vehicle and/or information on the other vehicle (e.g., image information of the other vehicle) while performing flight following the other vehicle (e.g., abnormal vehicle) and transmit the information to an emergency agency (e.g., police station or fire station). In addition, the drone 200 may be configured to output a siren and/or a warning signal while performing flight following the other vehicle to secure safety of neighboring vehicles of the other vehicle.

Front Road Emergency Situation

The processing device 180 of the autonomous vehicle 100 may be configured to determine whether an emergency situation has occurred in the front road of the vehicle using the detection device 160. For example, when an accident occurs in front of the subject vehicle, or when driving is impossible due to the road being blocked due to special matters (e.g., smoke of roads and tunnels, flashing of multiple vehicle emergency lights, and/or detection of movement of people on the road), the processing device 180 may be configured to recognize a front road emergency situation and activate the flight of the drone 200. The processing device 180 may be configured to induce a following vehicle and/or a person (e.g., a driver or a passenger) to evacuate to a safe place (e.g., a shoulder) using the drone 200. In addition, the processing device 280 of the drone 200 may be configured to collect surrounding environment information (e.g., surrounding image information) using the detection device 250 and transmit the information to an emergency agency.

Platoon Driving Situation

When the autonomous vehicle 100 is in a platoon driving situation, the processing device 180 of the autonomous vehicle 100 may be configured to output a notification to neighboring vehicles indicating that the autonomous vehicle 100 is in platoon driving situation by adjusting the flight pattern of the drone 200. In addition, the processing device 180 may be configured to notify neighboring vehicles of the start and end of a platooning queue by adjusting the flight pattern of the drone 200.

The processing device 180 may be configured to determine whether a following vehicle is ready to overtake based on the information obtained by the detection device 160. When the following vehicle is ready to overtake the subject vehicle, the processing device 180 may be configured to determine whether the overtaking is possible using the drone 200 and provide information indicating whether the overtaking is possible. The processing device 280 of the drone 200 may be configured to obtain information on an overtake lane (e.g., information on an opposite lane) using the detection device 250 and determine whether the overtaking is possible based on the obtained information on the overtake lane. The processing device 280 may be configured to notify the following vehicle that whether the overtaking is possible by adjusting the flight pattern of the drone.

Figure 3:
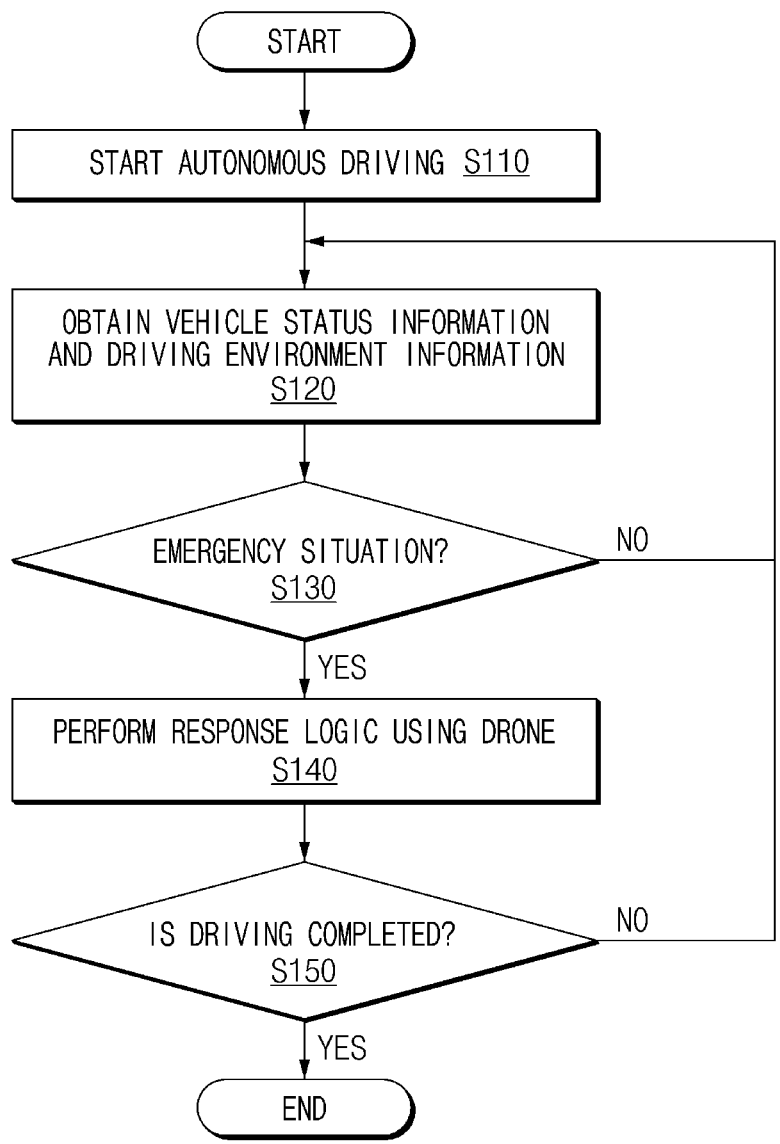
FIG. 3 is a flowchart of an emergency response method using a drone of an autonomous vehicle according to exemplary embodiments of the present disclosure.

FIG. 3 is a flowchart of an emergency response method using a drone of an autonomous vehicle according to exemplary embodiments of the present disclosure; Referring to FIG. 3, when a destination is set, the autonomous vehicle 100 may be configured to start autonomous driving (S110). The processing device 180 of the autonomous vehicle 100 may be configured to set a destination according to a user input and perform autonomous driving.

Additionally, the processing device 180 may be configured to obtain status information and driving environment information of the vehicle using the detection device 160 during autonomous driving (S120). The status information may include a vehicle speed, sound information, and/or whether transfer of driving control to a driver has failed. The driving environment information may include, for example, a speed of another vehicle, a distance between the vehicle and another vehicle, and/or a surrounding image.

The processing device 180 may be configured to determine whether the autonomous vehicle 100 is in an emergency situation based on the status information and the driving environment information of the vehicle. The processing device 180 may be configured to recognize an emergency situation occurring on the road based on status information and driving environment information of the vehicle. The emergency situation may be classified into a vehicle emergency situation, an another-vehicle emergency situation, a front road emergency situation, and a platoon driving situation.

When an emergency situation is determined, the processing device 180 may be configured to perform a response logic for the emergency situation using the drone 200 (S140). The processing device 180 may be configured to provide information indicating that the emergency situation has occurred on the front road in a response method matching the emergency situation using the drone 200. The processing device 180 may be configured to determine whether the driving of the autonomous vehicle 100 is completed (S150). The processing device 180 may be configured to repeatedly perform S120 to S140 until autonomous driving of the vehicle 100 is completed.

Figure 4:
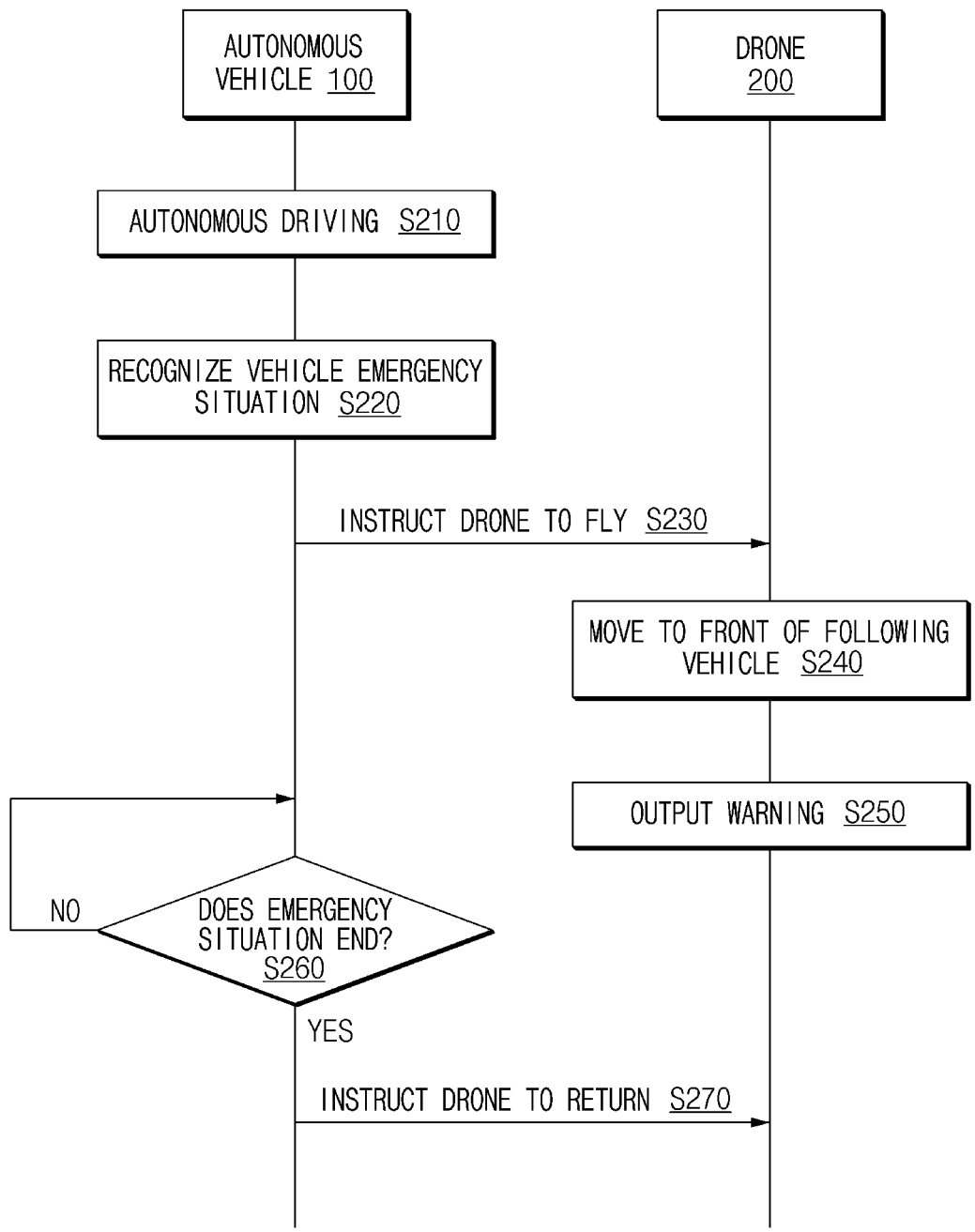
FIG. 4 is a flowchart of an emergency response method using a drone in in an emergency situation of a vehicle according to exemplary embodiments of the present disclosure.
Figure 5A:
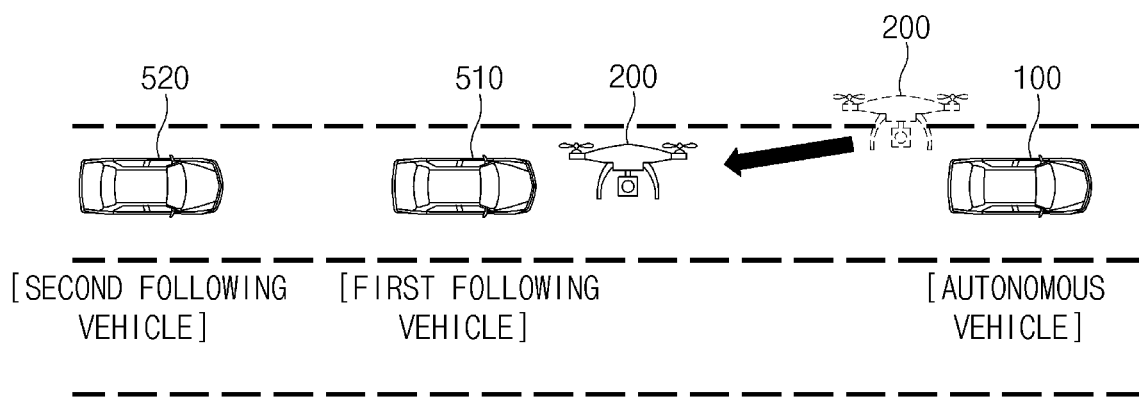
FIGS. 5A and 5B are exemplary diagrams showing emergency responses using a drone in an emergency situation of a vehicle according to embodiments of the present disclosure.
Figure 5B:
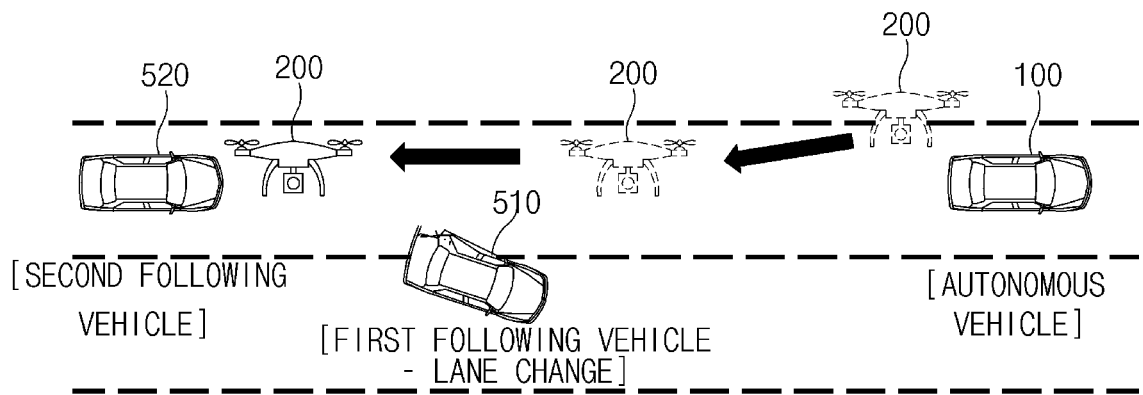
Figure 6:
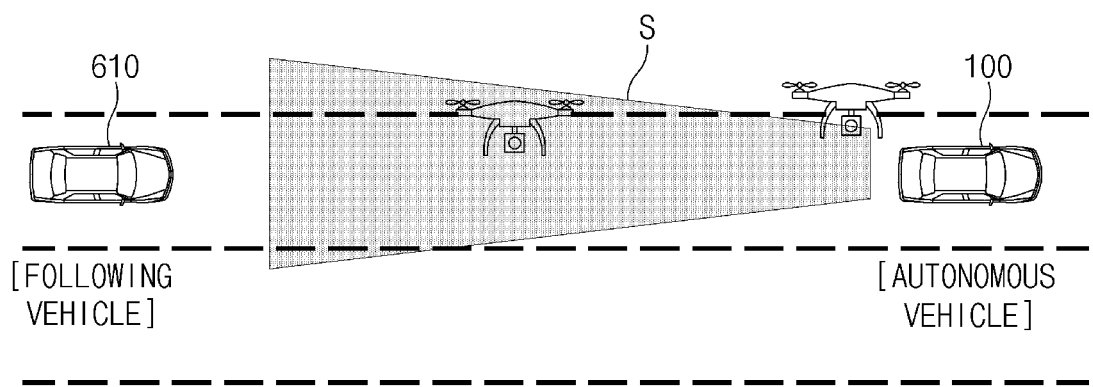
FIG. 6 is an exemplary view showing an emergency response of an autonomous vehicle in an emergency situation of a vehicle according to exemplary embodiments of the present disclosure.

FIG. 4 is a flowchart of an emergency response method using a drone in a vehicle emergency situation according to exemplary embodiments of the present disclosure. FIGS. 5A and 5B are exemplary diagrams showing emergency response using a drone in a vehicle emergency situation according to exemplary embodiments of the present disclosure. FIG. 6 is an exemplary view showing an emergency response of an autonomous vehicle in a vehicle emergency situation according to exemplary embodiments of the present disclosure. Referring to FIG. 4, the autonomous vehicle (hereinafter, referred to as a vehicle or subject vehicle) 100 may be configured to perform autonomous driving when an autonomous driving function is activated (S210). A command instructing activation of the autonomous driving function may be input by a user or may be input from an external device.

The vehicle 100 may be configured to recognize or detect a vehicle emergency situation during autonomous driving (S220). The processing device 180 of the vehicle 100 may be configured to obtain vehicle status information and driving environment information using the detection device 160 during autonomous driving. The processing device 180 may be configured to determine whether an emergency situation has occurred in the vehicle based on the vehicle status information and the driving environment information. For example, as shown in FIG. 5A, when the vehicle 100 in autonomous driving makes an emergency stop in a driving lane, the vehicle 100 may be configured to recognize that an emergency situation has occurred in the vehicle 100 itself.

When a vehicle emergency situation is detected, the vehicle 100 may be configured to instruct the drone 200 to fly (S230). The processing device 180 of the vehicle 100 may be configured to calculate a distance and a relative speed between the vehicle 100 and a following vehicle (e.g., a second vehicle) using the vehicle status information and the driving environment information obtained by the detection device 160 when the emergency situation has occurred in the vehicle 100. The processing device 180 may be configured to determine an emergency response using the drone 200 based on the calculated distance and relative speed between the vehicle 100 and the following vehicle. When the emergency response using the drone 200 is determined, the processing device 180 may be configured to instruct the drone 200 to activate the flight. When instructing the drone 200 to fly, the processing device 180 may be configured to transmit the current position of the vehicle 100 and a response method. The drone 200 may be configured to identify the current position of the vehicle 100 in real time using communication with the vehicle 100.

In response to the drone 200 receiving a flight instruction from the vehicle 100, the drone 200 may be configured to move to the front of the following vehicle traveling in the same lane as the vehicle 100 (S240). The drone 200 may be configured to start flying based on the current position (vehicle position) of the vehicle 100. The processing device 280 of the drone 200 may be configured to recognize the following vehicle located directly behind the vehicle 100 based on the vehicle position and move to the front of the corresponding following vehicle. Referring to FIG. 5A, the drone 200 may be configured to fly and move to the front of a first following vehicle 510 closest to the vehicle 100 among following vehicles 510 and 520 located in the driving lane where the vehicle 100 stops.

Further, the drone 200 may be configured to output a warning to the corresponding following vehicle after moving to the front of the following vehicle (S250). The processing device 280 of the drone 200 may be configured to adjust the flight of the drone 200 such that the drone 200 flies with a flight pattern (e.g., a vertical flight pattern) indicating a warning or may be configured to output a warning sound using a speaker. For example, the drone 200 may be configured to output a wanting in front of the first following vehicle 510 as shown in FIG. 5A. Thereafter, when the first following vehicle 510 leaves the lane where the vehicle 100 has been in an emergency stop through a lane change, the drone 200 may be configured to move to the front of a second following vehicle following the first following vehicle 510 and output a warning as shown in FIG. 5B. Accordingly, the drone 200 may be configured to sequentially provide warnings to other vehicles following the vehicle 100 in a lane in which the vehicle 100 is in an emergency stop. In particular, the drone 200 may be configured to output a warning within a predetermined distance based on the current position of the vehicle 100.

As another exemplary embodiment, referring to FIG. 6, the vehicle 100 may be configured to transmit a fake radar signal "S" to the rear using a radar signal generating device (not shown). When a following vehicle 610 receives the fake radar signal "S", the following vehicle 610 may be configured to recognize that there is a stopped vehicle in front of the following vehicle 610 and may be configured to reduce a vehicle speed. As described above, the vehicle that has been in the emergency stop may be configured to transmit the fake radar signal to allow a following vehicle to recognize that there is a vehicle that has stopped in front of the following vehicle even at a distance and to decelerate.

The vehicle 100 may be configured to identify whether the emergency situation has ended (S260). For example, when the response for the emergency situation has been processed, the vehicle 100 may be configured to determine that the emergency situation ends. When the emergency situation ends, the vehicle 100 may be configured to instruct the drone 200 to return (S270). The vehicle 100 may be configured to transmit a return position to the drone 200 when instructing the drone 200 to return.

Figure 7:
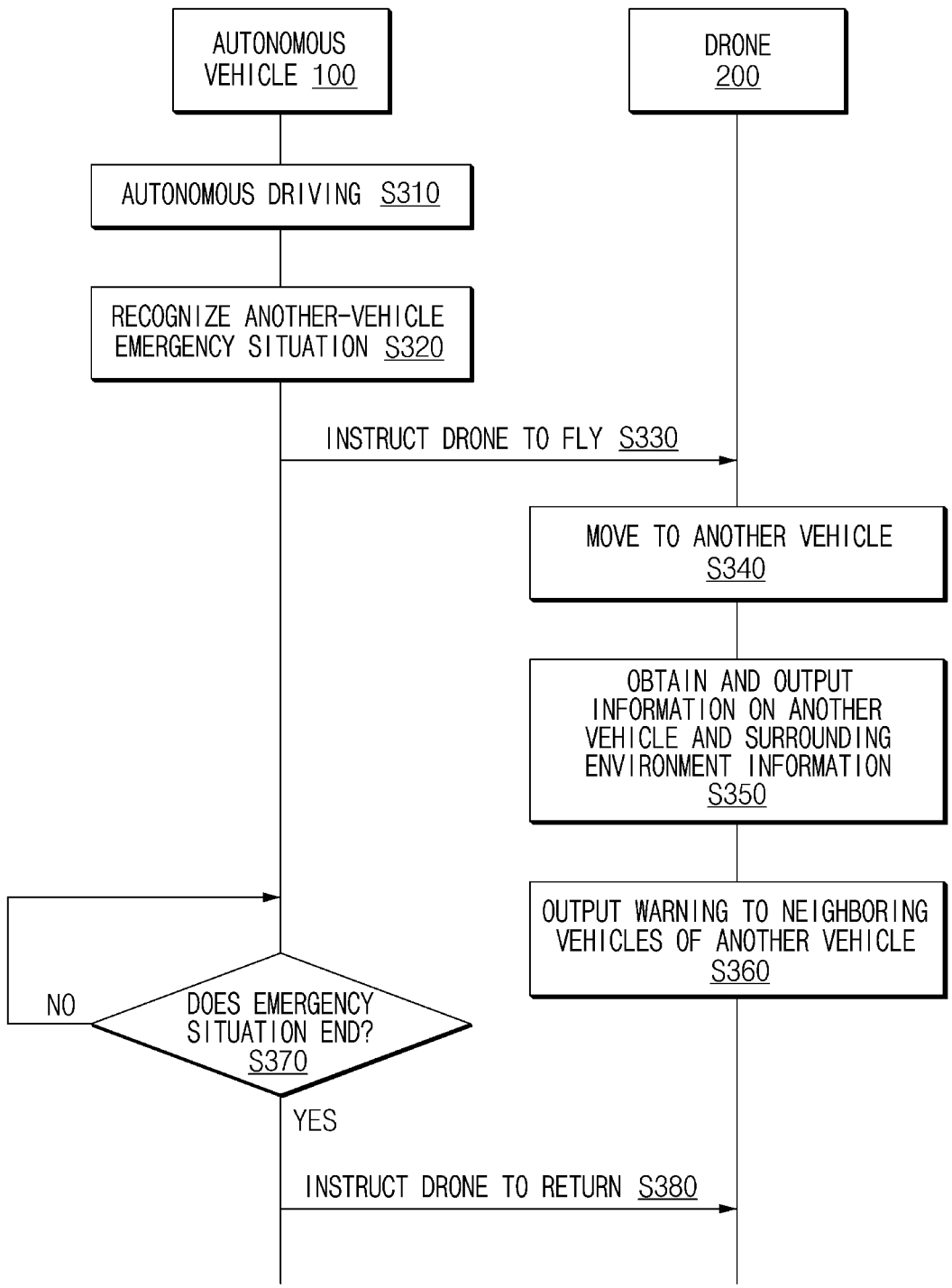
FIG. 7 is a flowchart of an emergency response method using a drone in an another-vehicle emergency situation according to exemplary embodiments of the present disclosure.
Figure 8:
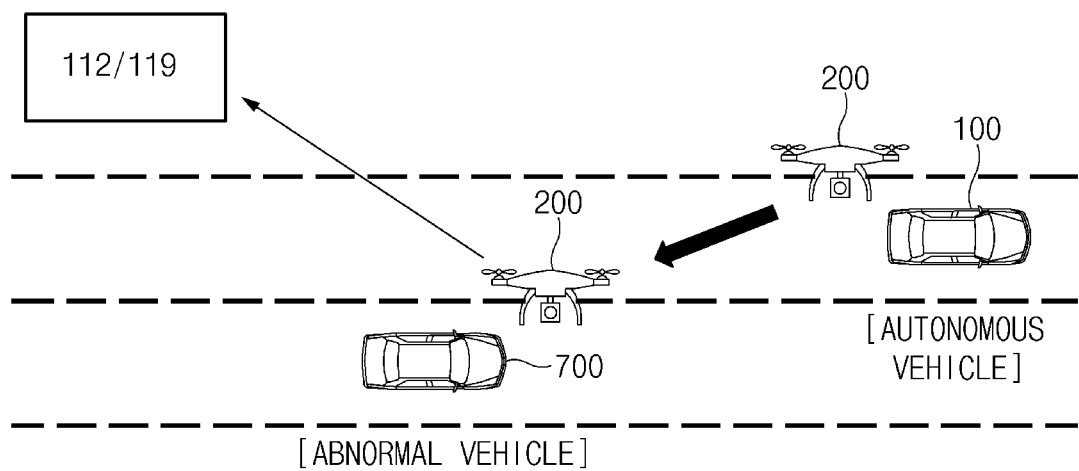
FIG. 8 is an exemplary view showing an emergency response using a drone in an another-vehicle emergency situation according to exemplary embodiments of the present disclosure.

FIG. 7 is a flowchart of an emergency response method using a drone in an another-vehicle emergency situation according to exemplary embodiments of the present disclosure. FIG. 8 is an exemplary view showing an emergency response using a drone in an another-vehicle emergency situation according to exemplary embodiments of the present disclosure. Referring to FIG. 7, the autonomous vehicle 100 may perform autonomous driving as an autonomous driving function is activated (S310).

The autonomous vehicle 100 may be configured to recognize an another-vehicle emergency situation occurring on a road while driving (S320). The processing device 180 of the autonomous vehicle 100 may be configured to recognize that an emergency situation has occurred in the other vehicle based on the driving environment information collected by the detection device 160. The processing device 180 may be configured to recognize that an emergency situation has occurred in another vehicle via communication with the other vehicle, or recognize that the emergency situation has occurred in the other vehicles by analyzing the behavior of other vehicles (e.g., driving patterns in a lane and/or whether the other vehicle stops).

The autonomous vehicle 100 may be configured to instruct the drone 200 to fly when the another-vehicle emergency situation is detected (S330). When instructing the drone 200 to fly, the autonomous vehicle 100 may be configured to transmit information on other vehicles (e.g., the position, vehicle number, and/or vehicle type of the other vehicle) and a response method together. The drone 200 may be configured to move to the other vehicle (abnormal vehicle) in which the emergency situation has occurred according to the instruction from the autonomous vehicle 100 (S340). The processing device 280 of the drone 200 may be configured to set the position of another vehicle as a destination and fly to the position.

The drone 200 may be configured to obtain information on the other vehicle and surrounding environment information of the other vehicle and transmit the information to an emergency agency (S350). The processing device 280 of the drone 200 may be configured to control flight such that the drone 200 follows the other vehicle. For example, when the other vehicle has stopped due to occurrence of an emergency situation, the processing device 280 may be configured to perform control such that the drone 200 performs hovering flight. In addition, the processing device 280 may be configured to perform a flight following the other vehicle, and obtain surrounding environment information (e.g., image information) of the other vehicle using the detection device 250.

Referring to FIG. 8, when the autonomous vehicle 100 detects an abnormal vehicle 700 in which an emergency situation has occurred, the autonomous vehicle 100 may be configured to determine an emergency response using the drone 200. The drone 200 may be configured to fly and move to a position where the abnormal vehicle 700 is located according to an instruction from the autonomous vehicle 100. The drone 200 may be configured to perform a flight following the abnormal vehicle 700 after moving to the position where the abnormal vehicle 700 is located. The drone 200 may be configured to perform a flight following the abnormal vehicle, obtain the surrounding environment information of the abnormal vehicle 700 using a camera or the like and transmit the surrounding environment information to an emergency agency.

The autonomous vehicle 100 may be configured to identify whether the emergency situation has ended (S370). For example, when the response for the emergency situation has been processed, the vehicle 100 may be configured to determine that the emergency situation ends. When the emergency situation has ended, the autonomous vehicle 100 may be configured to instruct the drone 200 to return (S380). The vehicle 100 may be configured to transmit a return position to the drone 200 when instructing the drone 200 to return.

Figure 9:
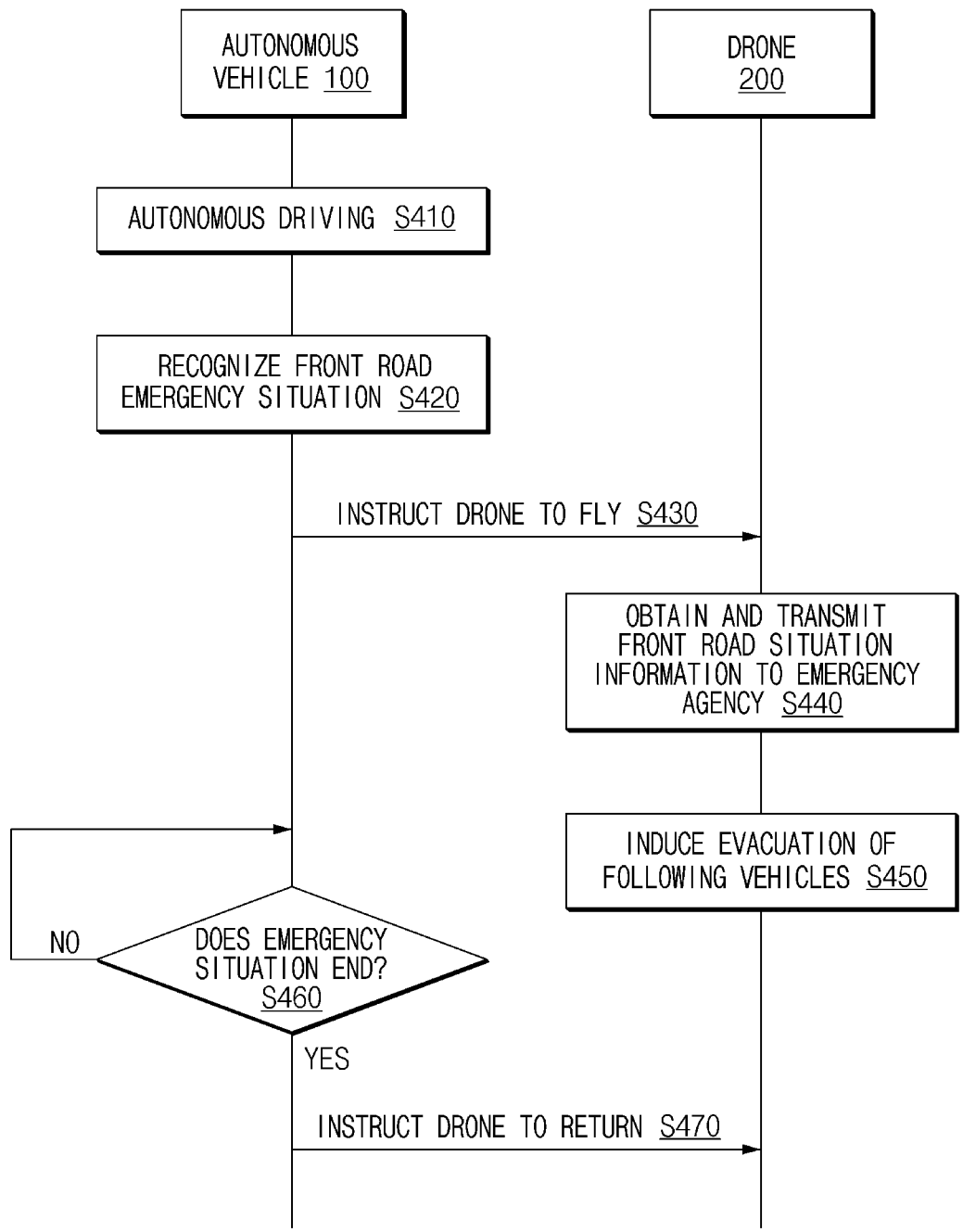
FIG. 9 is a flowchart of an emergency response method using a drone in a front road emergency situation according to exemplary embodiments of the present disclosure.
Figure 10:
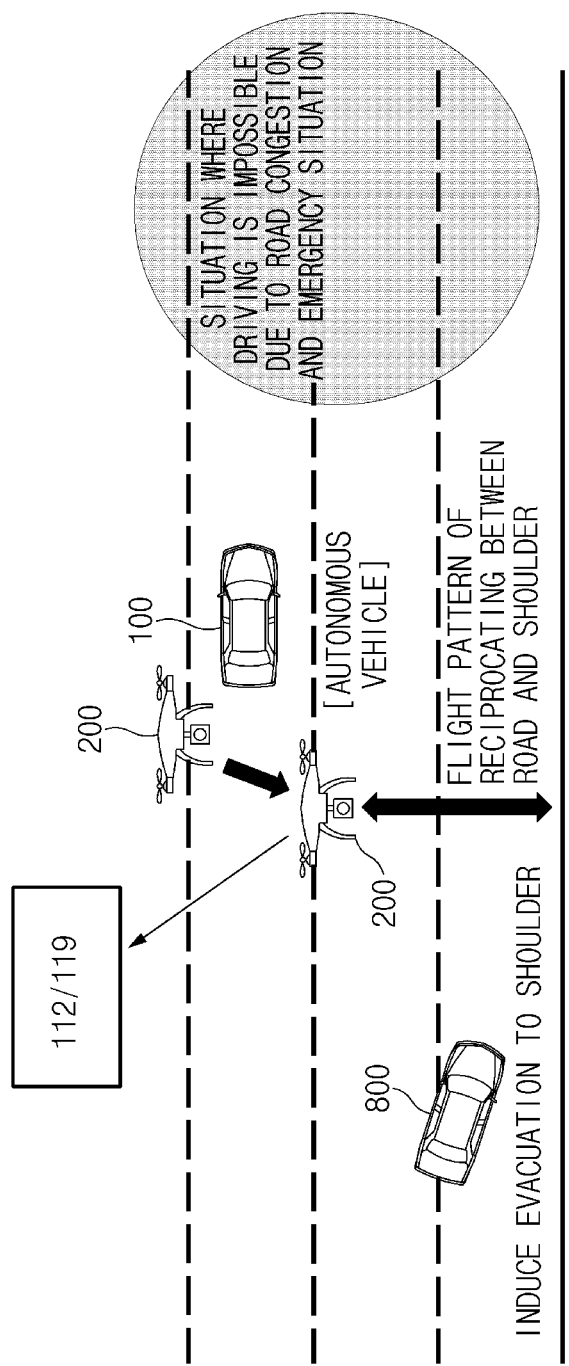
FIG. 10 is an exemplary diagram showing an emergency response using a drone in a front road emergency situation according to exemplary embodiments of the present disclosure.

FIG. 9 is a flowchart of an emergency response method using a drone in a front road emergency situation according to exemplary embodiments of the present disclosure. FIG. 10 is an exemplary diagram showing an emergency response using a drone in a front road emergency situation according to exemplary embodiments of the present disclosure. Referring to FIG. 9, the autonomous vehicle 100 may be configured to perform autonomous driving as an autonomous driving function is activated (S410).

The autonomous vehicle 100 may be configured to detect a front road emergency situation occurring on a road while driving (S420). In particular, the autonomous vehicle 100 may be configured to detect the front road emergency situation when driving is impossible due to an accident occurring on the front road, road construction, or the like. The autonomous vehicle 100 may be configured to instruct the drone 200 to fly when the front road emergency situation is recognized (S430). The autonomous vehicle 100 may be configured to transmit a response method to the drone 200 when instructing the drone 200 to fly.

The drone 200 may be configured to obtain front road situation information according to an instruction from the autonomous vehicle 100 and transmit the information to an emergency agency (S440). The processing device 280 of the drone 200 may be configured to capture an image of a situation on the front road situation using a camera or the like and transmit the captured image information to an emergency agency.

The drone 200 may be configured to induce a following vehicle which is driving on a road to evacuate to a safe place (e.g., a shoulder) (S450). In addition, the drone 200 may induce people on the road to evacuate to a safe place. In particular, the drone 200 may guide an evacuation direction by controlling the flight pattern of the drone 200. In addition, the drone 200 may be configured to provide information (e.g., arrows) indicating the evacuation direction using a projector or the like. Referring to FIG. 10, in response to determining that an emergency situation has occurred on a front road, the autonomous vehicle 100 may be configured to notify a following vehicle 800 of the occurrence of the front road emergency situation using the drone 200. The drone 200 may reciprocate between a driving lane and a shoulder under the control of the autonomous vehicle 100 and induce the evacuation of the following vehicle 800.

The autonomous vehicle 100 may be configured to identify whether the emergency situation has ended (S460). When the emergency situation has ended, the autonomous vehicle 100 may be configured to instruct the drone 200 to return to an original position (S470). The vehicle 100 may be configured to transmit a return position to the drone 200 when instructing the drone 200 to return.

Figure 11:
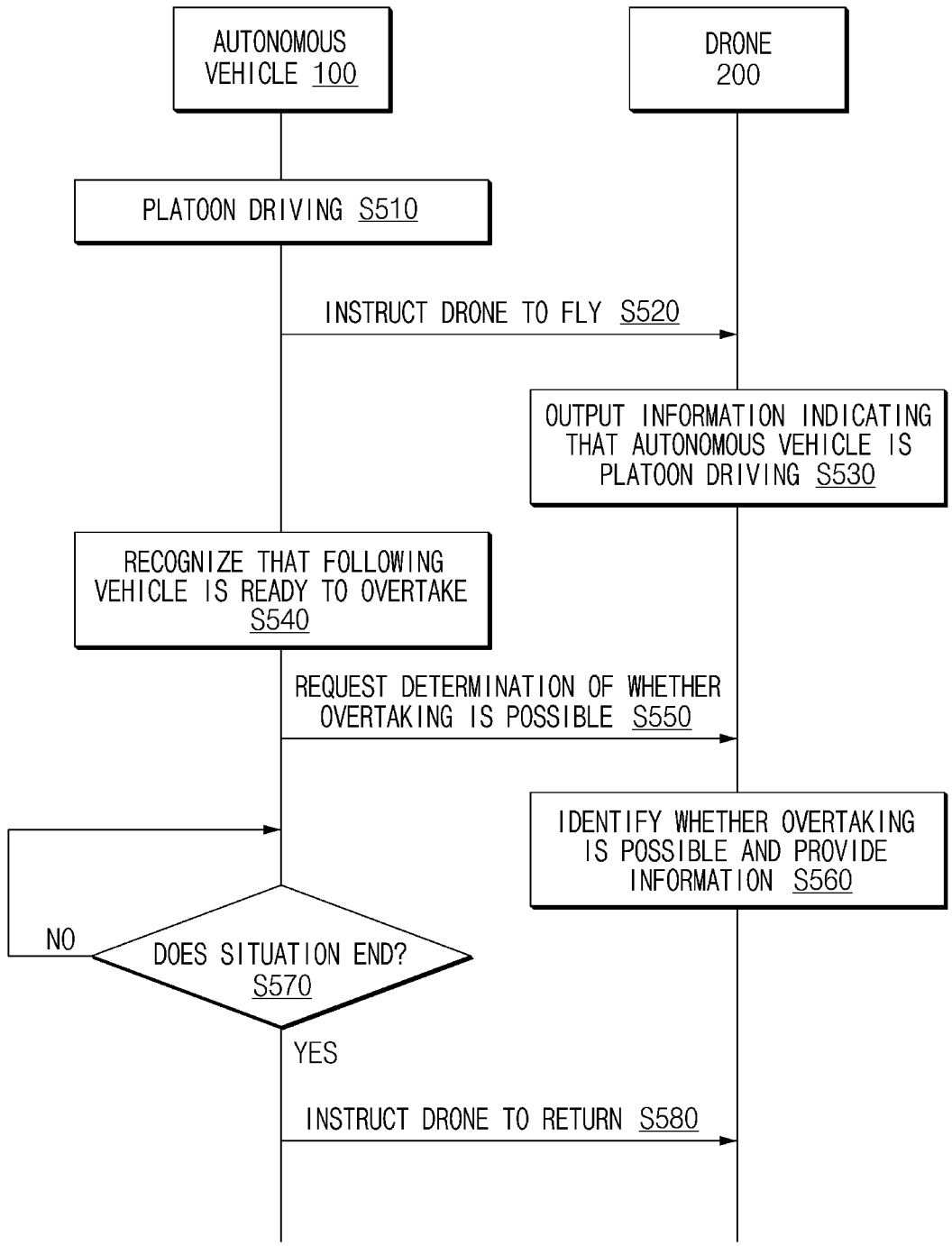
FIG. 11 is a flowchart of an emergency response method using a drone in a platoon driving situation according to exemplary embodiments of the present disclosure.
Figure 12A:
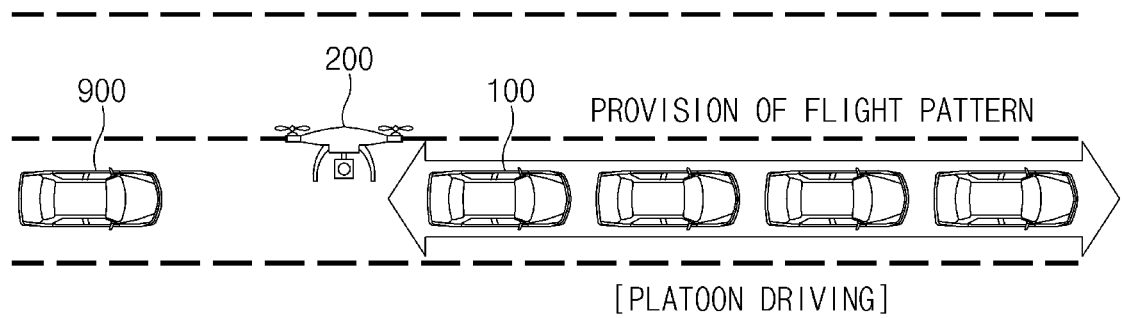
FIGS. 12A and 12B are exemplary diagrams showing emergency responses using a drone in a platoon driving situation according to exemplary embodiments of the present disclosure.
Figure 12B:
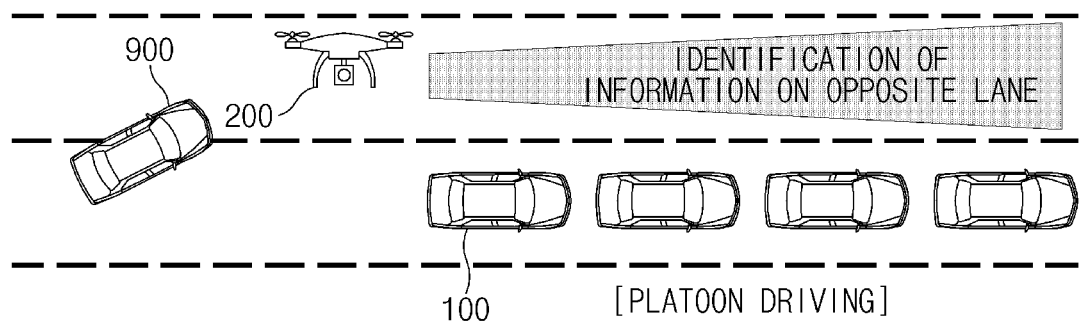

FIG. 11 is a flowchart of an emergency response method using a drone in a platoon driving situation according to exemplary embodiments of the present disclosure. FIGS. 12A and 12B are exemplary diagrams showing emergency responses using a drone in a platoon driving situation according to exemplary embodiments of the present disclosure. Referring to FIG. 11, the autonomous vehicle 100 may perform platoon driving with at least one other vehicle (S510).

The autonomous vehicle 100 may be configured to instruct the drone 200 to fly during platoon driving (S520). The autonomous vehicle 100 may be configured to provide the drone 200 with information regarding the leading vehicle and the trailing vehicle of the platooning queue when instructing the drone 200 to fly. When the drone 200 receives a flight instruction from the autonomous vehicle 100, the drone 200 may be configured to output information indicating that the autonomous vehicle 100 is in platoon driving (S530). Referring to FIG. 12A, the drone 200 may reciprocate between the leading vehicle and the trailing vehicle of a platooning queue and transmit information indicating that the autonomous vehicle 100 is platoon-driving to a following vehicle 900.

The autonomous vehicle 100 may be configured to recognize that the following vehicle is ready to overtake during platoon driving (S540). For example, when the following vehicle attempts to enter an opposite lane of which the driving direction is opposite, the autonomous vehicle 100 may be configured to determine that the following vehicle is ready to overtake. When the autonomous vehicle 100 determines that the following vehicle is ready to overtake, the autonomous vehicle 100 may be configured to request the drone 200 to determine whether the overtaking is possible (S550).

The drone 200 may be configured to identify whether overtaking is possible at the request of the autonomous vehicle 100 (S560) and provide information. Referring to FIG. 12B, the processing device 280 of the drone 200 may be configured to obtain information on an opposite lane using the detection device 250 and analyze the obtained information to determine whether the following vehicle 900 is able to overtake. In response to determining that overtaking is possible, the processing device 280 may be configured to operate the drone 200 to fly over the opposite lane. The following vehicle 900 may be configured to determine whether to overtake by identifying the flight position of the drone 200. In addition, the processing device 280 may be configured to provide information indicating that overtaking is impossible when the drone 200 detects a vehicle approach to the opposite lane while the drone is flying above the opposite lane and then returns to the original lane (e.g., a platoon driving lane).

The autonomous vehicle 100 may be configured to identify whether the situation ends (S460). The autonomous vehicle 100 may be configured to determine that the situation has ended when platoon driving is terminated or when overtaking of the following vehicle is completed. When the emergency situation ends, the autonomous vehicle 100 may be configured to instruct the drone 200 to return to an original position (S470). The vehicle 100 may be configured to transmit a return position to the drone 200 when instructing the drone 200 to return.

Figure 13:
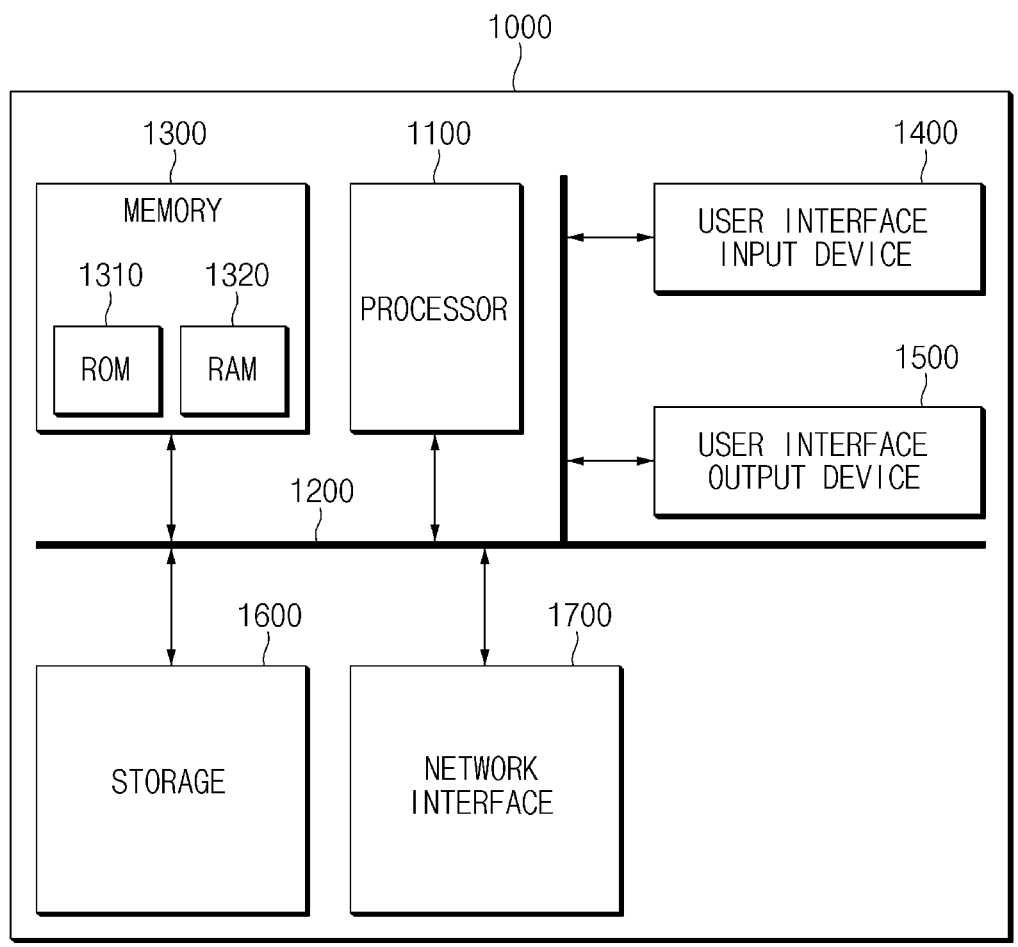
FIG. 13 is a block diagram showing a computing system that executes an emergency response method using a drone according to exemplary embodiments of the present disclosure.

FIG. 13 is a block diagram showing a computing system that executes an emergency response method using a drone according to exemplary embodiments of the present disclosure. Referring to FIG. 5, a computing system 1000 may include at least one processor 1100, a memory 1300, a user interface input device 1400, a user interface output device 1500, storage 1600, and a network interface 1700, which are connected with each other via a bus 1200. The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains. Accordingly, the embodiment disclosed in the present disclosure is not intended to limit the technical idea of the present disclosure but to describe the present disclosure, and the scope of the technical idea of the present disclosure is not limited by the exemplary embodiment. The scope of protection of the present disclosure should be interpreted by the following claims, and all technical ideas within the scope equivalent thereto should be construed as being included in the scope of the present disclosure.

According to the present disclosure, it may be possible to respond to (cope with) the emergency situation using a drone to secure the safety of the vehicle occupant and prevent a secondary accident when an emergency situation occurs on the road during autonomous driving.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous vehicle, comprising:
   a communication device configured to support communication with a drone;
   a detection device configured to detect vehicle status information and driving environment information;
   a processing device configured to detect an emergency situation occurring on a road based on the vehicle status information and the driving environment information while autonomous driving and perform a response logic matching the recognized emergency situation using the drone,
   wherein the processing device is configured to transmit a radar signal to following vehicles using a radar signal generating device, when determining that an emergency situation has occurred in the autonomous vehicle, and
   wherein the radar signal indicates that a vehicle in which an emergency situation has occurred is present in front of the following vehicles,
   wherein the processing device is configured to instruct the drone to move to another vehicle in which an emergency situation has occurred in an another-vehicle emergency situation,
   wherein the drone is configured to:

perform a flight following another vehicle using the position information of the another vehicle provided from the processing device;

obtain surrounding environment information of the another vehicle using sensors mounted on the drone; and transmit the obtained information to an emergency agency in the another-vehicle emergency situation, and wherein the processing device is configured to determine activation of flight of the drone based on a distance between the autonomous vehicle and a following vehicle in a same lane as the autonomous vehicle and a relative speed of the following vehicle.

2. The autonomous vehicle of claim 1, wherein the emergency situation is one of a vehicle emergency situation, the another-vehicle emergency situation, a front road emergency situation, and a platoon driving situation.

3. The autonomous vehicle of claim 2, wherein the processing device is configured to allow the drone to move in front of the following vehicle and output a warning.

4. The autonomous vehicle of claim 3, wherein the processing device is configured to:
provide the warning to following vehicles in an order of a smallest distance between the autonomous vehicle and two or more following vehicles when there are the following vehicles in the same lane.

5. The autonomous vehicle of claim 2, wherein the processing device is configured to output the warning to neighboring vehicles of the another vehicle using the drone.

6. The autonomous vehicle of claim 2, wherein the processing device is configured to obtain situation information of a front road using sensors mounted on the drone, transmit the situation information to an emergency agency, and induce evacuation of a following vehicle in the front road emergency situation.

7. The autonomous vehicle of claim 2, wherein the processing device is configured to provide information indicating that the autonomous vehicle is platoon-driving in front of a following vehicle to the following vehicle using a flight pattern of the drone in the platoon driving situation.

8. The autonomous vehicle of claim 7, wherein the processing device is configured to identify and provide whether the following vehicle is able to overtake using the drone when recognizing that the following vehicle is ready to overtake.

9. A drone-based emergency response method in an autonomous vehicle, comprising:
detecting, by a controller, vehicle status information and driving environment information while autonomous driving;
detecting, by the controller, an emergency situation occurring on a road based on the vehicle status information and the driving environment information; and
performing, by the controller, a response logic matching the recognized emergency situation using the drone,
wherein the performing of the response logic includes transmitting a radar signal to following vehicles using a radar signal generating device, when determining that an emergency situation has occurred in the autonomous vehicle,
wherein the radar signal indicates that a vehicle in which an emergency situation has occurred is present in front of the following vehicles,
wherein the performing of the response logic includes:
instructing, by the processing device, the drone to move to another vehicle in which an emergency situation has occurred in an another-vehicle emergency situation;
performing, by the drone, a flight following another vehicle using the position information of the another vehicle provided from the processing device;
obtaining, by the drone, surrounding environment information of the another vehicle using sensors mounted on the drone; and
transmitting, by the drone, the obtained information to an emergency agency in the another-vehicle emergency situation, and
wherein the performing of the response logic includes:
determining, by the controller, activation of flight of the drone based on a distance between the autonomous vehicle and a following vehicle in a same lane as the autonomous vehicle and a relative speed of the following vehicle.

10. The drone-based emergency response method of claim 9, wherein the emergency situation is one of a vehicle emergency situation, an another-vehicle emergency situation, a front road emergency situation, and a platoon driving situation.

11. The drone-based emergency response method of claim 10, wherein the performing of the response logic includes:
instructing, by the controller, the drone to fly; and
allowing, by the drone, to move in front of the following vehicle and output a warning.

12. The drone-based emergency response method of claim 10, wherein the performing of the response logic further includes:
providing, by the drone, a warning to a neighboring vehicle of the another vehicle.

13. The drone-based emergency response method of claim 10, wherein the performing of the response logic includes:
instructing, by the controller, the drone to fly in the front road emergency situation;
obtaining, by the drone, front road situation information and transmitting the obtained information to an emergency agency; and
inducing, by the drone, evacuation of following vehicles.

14. The drone-based emergency response method of claim 10, wherein the performing of the response logic includes:
instructing, by the controller, the drone to fly in the platoon driving situation; and
outputting, by the drone, information indicating that the autonomous vehicle is platoon-driving to a following vehicle following a platooning queue.

15. The drone-based emergency response method of claim 14, wherein the performing of the response logic further includes:
requesting, by the controller, the drone to identify whether overtaking is possible in response to detecting that the following vehicle is ready to overtake; and
identifying, by the drone, whether the overtaking is possible and performing guide according to the request.

* * * * *